United States Patent [19]
Heidbreder

[11] Patent Number: 5,564,605
[45] Date of Patent: Oct. 15, 1996

[54] PORTABLE FLUID DISPENSER

[76] Inventor: Gregg J. Heidbreder, 9259 E. Raintree, #1021, Scottsdale, Ariz. 85260

[21] Appl. No.: 377,174

[22] Filed: Jan. 24, 1995

[51] Int. Cl.$^6$ .................................................. B67D 5/06
[52] U.S. Cl. ...................... 222/192; 222/397; 222/400.8
[58] Field of Search ............................. 222/78, 175, 325, 222/340, 400.7, 400.8, 401, 397, 192; 224/148; 206/315.3

[56] References Cited

U.S. PATENT DOCUMENTS

| | | | |
|---|---|---|---|
| 1,106,937 | 8/1914 | Goff | 222/400.8 |
| 2,281,142 | 4/1942 | Davis | 222/400.8 |
| 4,436,227 | 3/1984 | Johnson, Jr. et al. | 222/382 |
| 4,921,143 | 5/1990 | Billet | 222/175 |
| 5,060,833 | 10/1991 | Edison et al. | 224/148 |
| 5,105,958 | 4/1992 | Patton | 215/100 |
| 5,186,362 | 2/1993 | Biagi, Jr. | 222/400.8 |
| 5,244,114 | 8/1993 | Traegde | 220/737 |
| 5,263,618 | 11/1993 | Talavera | 224/148 |

FOREIGN PATENT DOCUMENTS 432533  8/1926  Germany ............................ 222/400.8

Primary Examiner—Andres Kashnikow
Assistant Examiner—Philippe Derakshani
Attorney, Agent, or Firm—Snell & Wilmer L.L.P.

[57] ABSTRACT

A portable fluid dispenser that allows a person to dispense a desired amount of fluid from the top of a golf bag. The portable fluid dispenser includes a pump means that provides positive pressure which forces fluid from containers located within a pouch. The pouch can be incorporated into or retrofitted to a golf bag. The invention contains varying sized container lids which are adaptable to common beverage containers. The dispensing device may also be retrofitted into other athletic bags.

21 Claims, 2 Drawing Sheets

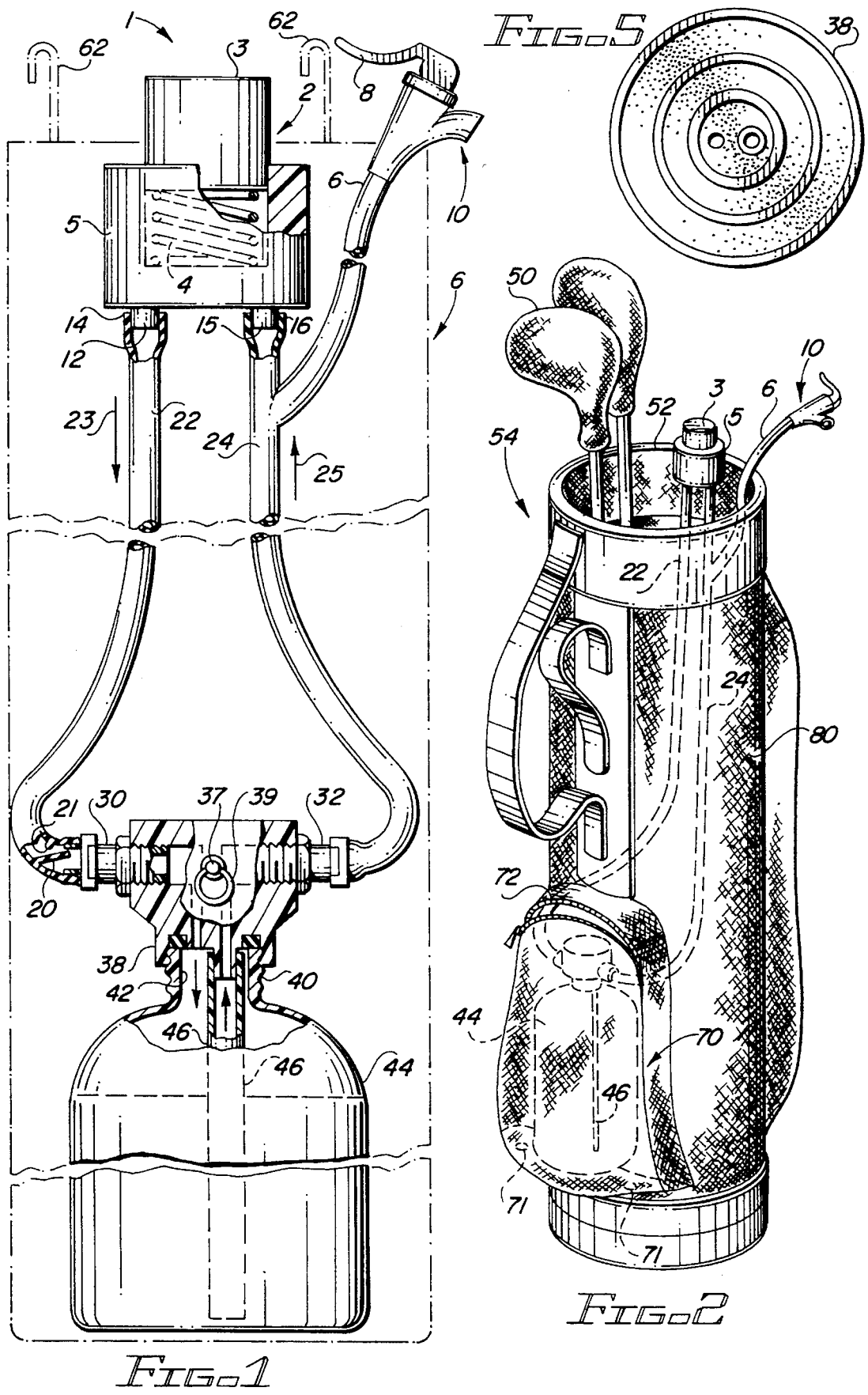

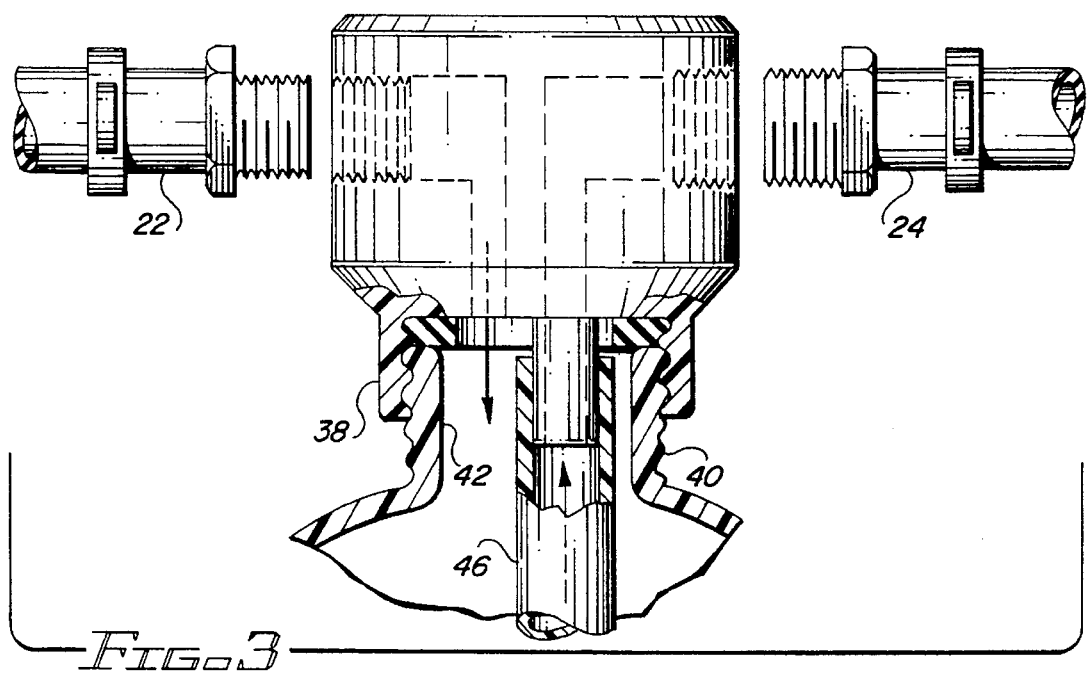
FIG._3
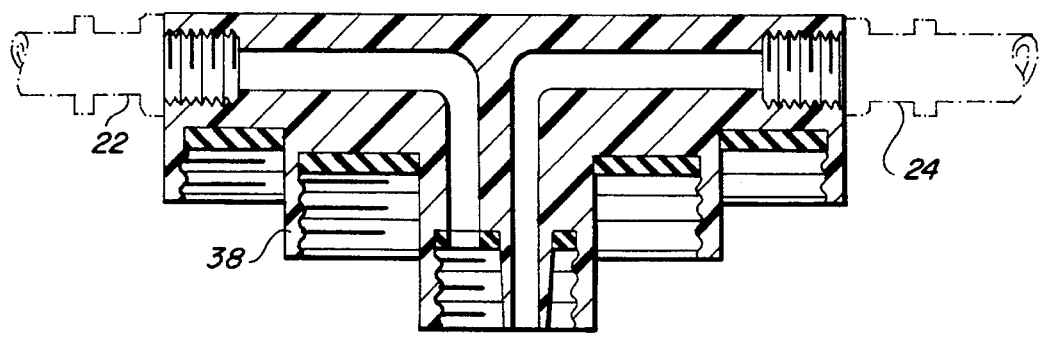
FIG._4
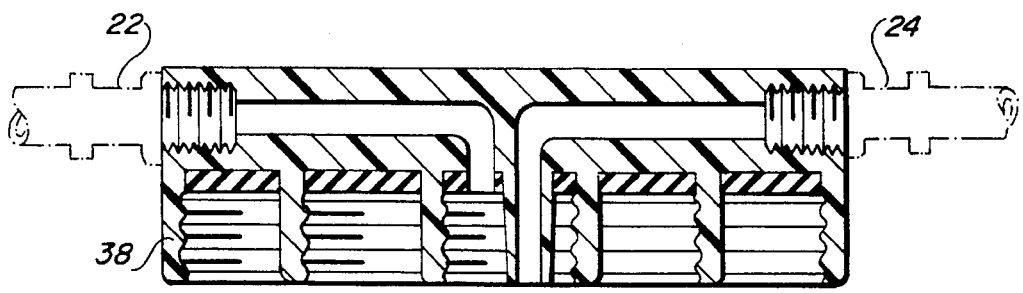
FIG._6

PORTABLE FLUID DISPENSER

FIELD OF THE INVENTION

This invention generally relates to a sports apparatus, and more specifically relates to a portable fluid dispenser adapted onto a golf bag. The device allows a person to dispense a specific amount of beverage from a golf bag. If a large amount of beverage is needed, the device eliminates the need to carry many small beverage containers. The dispenser includes a pump means that forces fluid from containers located within a pouch in the golf bag. The invention contains varying sized container lids which are adaptable to common beverage bottles.

BACKGROUND OF THE INVENTION

With the increased popularity of golf, the sport has become a social event for its participants. During the game, many golfers bring their own drinks with them. When many people are golfing together, each golfer must bring his own supply of beverages. Golfing is a sport that involves many people and frequent rest periods. The rest periods in golf, i.e. waiting between holes, can be for extended periods of time. During rest periods, each golfer typically refreshes his thirst with a bottle of soda, beer or water. Many drinks may be consumed by each golfer during these extended periods. If one golfer forgets to bring a beverage, he must share the same bottle with another golfer or buy a more expensive drink from the clubhouse. The golfers, however, may not be currently passing by the clubhouse or the clubhouse may be far away. A need exists for a golf bag that can dispense beverages for many golfers to avoid the need for many bottles or the sharing of one bottle.

Most golf bags are not designed or built to accommodate the storage of beverage bottles or cans. The organization and inconvenience of buying, carrying and retrieving many beverages can be cumbersome. During a golf game, a golfer would like a small drink at frequent intervals. A canned or bottled beverage contains a large quantity of fluid (8–12 ozs.) which either must be drunk all at one time or the remaining beverage must be saved. Saving a beverage is extremely cumbersome during a golf game because the fluid would spill out of the open container while driving in a golf cart or swinging a golf club. A need exists for a golf bag that can dispense specific quantities of beverages without the need for obtaining an individual beverage container.

Many golf course owners and players are concerned about beverage can liter on the golf courses. After finishing a drink from a beverage container, the beverage container is usually discarded and not reused. Discarding many beverage containers is environmentally wasteful and causes increased quantities of garbage. A need exists for a dispensing device that replenishes a quantity of beverage in a reusable cup without the need of a new container for each drink.

With the increasing size of golf courses and the growing number of people, who are not in top physical condition, playing the sport, motorized golf carts are commonly available. Because golf bags are typically carried in the rear of the golf cart, the concern about heavy golf bags is reduced. Consequently, larger golf bags can be constructed and more sophisticated devices can be included in the golf bags. A growing market demand exists for golf bags with more features.

For many years, golf bags and beverage containers have been available for purchase. Included within current patent literature are many devices which are directed to fluid dispensers and the basic concept of fluid dispensers in combination with a golf bag.

The Billet patent, U.S. Pat. No. 4,921,143, issued in 1990, discloses a portable beverage dispenser carried on the back of a vendor. The dispenser includes an insulated beverage tank with a discharge conduit which allows fluid from the lower end of the tank to be forced into a discharge means. A pressurizing conduit enters from the top of the tank. A pump means forces a pressurized gas into the upper end of the tank. An optional cup dispenser may be attached to the sidewall of the tank. The tubing in this patent also is arranged so as to input and output from opposite ends of the tank.

The Traegde patent, U.S. Pat. No. 5,244,144, issued in 1993, discloses a golf bag drink holder apparatus and method. The drink holder connects to a golf bag and holds a typical sports bottle. The sports bottle pivots about its connection point to keep the bottle in an upright position and avoid spillage. The system described by this patent is relevant in that it teaches a portable fluid receptacle with a dispensing means enclosed within a holder and incorporated onto a golf bag. The receptacle may be varying sizes or shapes.

The Edison, et al. patent, U.S. Pat. No. 5,060,833, issued in 1991, discloses a portable dispensing system that allows a bicyclist to drink fluids anytime he desires. A collapsible tank is contained in a backpack pouch with a conduit emanating from the backpack to the dispensing means. The dispensing means consists of a valve device that is held in the mouth of the user and releases water upon compression by the user's teeth. Additionally, the backpack includes a supply of oxygen with a conduit leading to the bicyclists nostrils.

The Talavera patent, U.S. Pat. No. 5,263,618, issued in 1993, discloses a harness, for attachment to the body of a person, with article holding pockets. At least one bottle may be placed in the holding pockets. A conduit emanates from the water bottle allowing the user to drink from the bottle without using his hands. The system described by this patent is relevant in that it teaches a portable dispenser incorporated into a carrying case and a dispensing means. The holder may contain more than one bottle and varying size bottles.

The Patton patent, U.S. Pat. No. 5,105,958, issued in 1992, discloses a bottle support assembly which is attached to the outside of a golf bag. A bottle, having a special grove, attaches to the support. The support consists of a retainer bracket, hanger strap and retaining belt.

The foregoing patents indicate that the prior art discloses some of the present dispenser's structures including a pump means, dispensing means and cold pouch. The present dispenser adapted onto a golf bag contains important improvements on the prior art to justify differentiation including removable containers, varying sized container lids adaptable to common beverage bottles, a two bottle option and a dispenser adapted onto a golf bag.

SUMMARY OF THE INVENTION

Accordingly, it is a broad aspect of the present invention to provide for a dispenser which allows a specific amount of fluid to be dispensed from a golf bag.

It is a further object of the present invention to provide a golf bag that can dispense beverages for many golfers to avoid the need for many bottles or the sharing of one bottle.

It is a further object of the present invention to provide a golf bag that can dispense specific quantities of beverages without the need for retrieving the beverage container.

It is a further object of the present invention to provide a dispensing device that replenishes a quantity of beverage in a reusable cup without the need of a new container for each drink.

It is a further object of the present invention to provide a golf bag with extra features.

It is a further object of the present invention to provide a golf bag that dispenses beverages out of the top of the golf bag.

It is a further object of the present invention to provide a fluid dispenser adapted onto a golf bag, wherein the dispenser is shaped like a golf club.

It is a further object of the present invention to provide a golf bag with a pump means that forces fluid from containers located within a pouch connected to the golf bag.

It is a further object of the present invention to provide varying sized container lids which are adaptable to common beverage containers and prevent the escape of pressure in the containers.

It is a further object of the present invention to provide a dispenser incorporated in a golf bag with the tubing located inside the bag's lining.

It is a further object of the present invention to provide a dispenser which can be easily removed from a golf bag for cleaning.

It is a further object of the present invention to provide a dispenser adapted onto a golf bag that is connected to at least one container located within a cold/heat pouch on the golf bag.

It is a further object of the present invention to provide a dispenser which contains an insulated thermos for hot fluids as its liquid container.

It is a further object of the present invention to provide a portable dispenser that may be attached to a golf bag.

It is a further object of the present invention to provide a dispenser with a pump means that forces air into conduits connected to common beverage containers, thereby forcing fluid to exit from the container and into the dispenser.

It is a further object of the present invention to provide a portable beverage dispenser which is simple in construction and easy and reliable to use.

It is a further object of the present invention to provide a portable beverage dispenser which easily can be pressurized to assist in the effective dispensing of a beverage.

It is a further object of the present invention to provide a beverage dispenser which includes all of the necessary elements for dispensing a beverage associated therewith, including a cup dispenser and a pressurizing device.

It is a further object of the present invention to provide an efficient arrangement of elements in a portable beverage dispenser to make it easy for the user to dispense a beverage therefrom.

The foregoing objectives are met by the present device which contains a pump means (manual, gas, electric) which forces fluid out of a container and into a dispensing means. The pump forces air into a pressure conduit which is connected to the container lid. Various size container lids, with two openings on the side of the lid, are adaptable to various size containers. One opening receives the air from the pump, allowing the air to be injected into the container. The injection of air into the container forms pressure in the container, which forces the fluid out of the container. A third conduit, which is immersed in the fluid, is connected to the second opening, allowing the fluid to exit the container. The second opening is connected to a fluid flow conduit, which is connected to the dispensing means.

Preferred embodiments include the dispensing and pump means connected to a golf bag and the fluid container located within the golf bag, preferably in an ice-filled, water-resistant pouch. The conduits are located within the sides of the golf bag. The conduits, pump means and discharge means may be contained in a housing which may be retrofitted to an existing golf bag. The input and output conduits can be connected to two or more containers simultaneously to increase the fluid capacity of the device. The container lid can be of various circumferences to adapt to various container openings. The dispensing device can be shaped like a golf club head, so as to blend in with the remaining golf clubs in the golf bag. The fluid container may be an insulated thermos for hot fluids.

These and other objects, features and advantages of the present invention will become more apparent to those skilled in the art from the following more detailed description of the non-limiting preferred embodiment of the invention taken with reference to the accompanying Figures.

BRIEF DESCRIPTION OF THE DRAWINGS

Briefly summarized, a preferred embodiment of the invention is described in conjunction with the illustrative disclosure thereof in the accompanying drawings, in which:

FIG. 1 is a perspective view showing a preferred embodiment of the present invention;

FIG. 2 is a perspective view showing a preferred embodiment of the present invention incorporated into a golf bag;

FIG. 3 is a cross-sectional view along line A–A' of FIG. 1 showing a preferred embodiment of the lid means;

FIG. 4 is a cross-sectional view of an alternative embodiment of a lid means;

FIG. 5 is a bottom view of an alternative embodiment of a lid means; and

FIG. 6 is a cross-sectional view of an alternative embodiment of a lid means.

DETAILED DESCRIPTION OF THE PREFERRED EMBODIMENT

Referring particularly to the drawings, the elements of the device of the present invention are shown.

A portable fluid dispenser 1 containing a pump means 2 for providing positive pressure. The pump means 2 is a manually operated device as disclosed in U.S. Pat. No. 4,436,227, which is hereby incorporated by reference. The pump means 2 is of the type consisting of a plunger 3 sliding in a base 5 which communicates with a pressure conduit 22. When the plunger 3 is released, the plunger 3 is moved back up by a coiled compression spring 4 acting between the underside of the plunger 3 and the inner surface of the bottom wall of the base 5.

The bottom of the base 5 contains a first and second small port 12, 14. The first ends of the pressure conduit 22 and a fluid flow conduit 24 are fixedly attached around the first and second small ports 12, 16 in the base 5 with any clamp suitable for securing 14, 15, such as a circular spring clamp or a screw-actuated hose clamp. The first port 12 defines an opening in the base 5, whereby air 23 can exit the base 5 and enter the pressure conduit 22. A flap valve 20 is pivotally connected on the inside of the pressure conduit 22. A bumper 21 extends from the inside of the pressure conduit 22, preventing the flap valve 20 from retracting toward the base 5, thus preventing backflow into the pump means 2. The second port 16 is closed to prevent a fluid 25 from entering the base 5.

Cylindrical connectors 29 contain a passageway 34 through the center of the connectors to allow the flow of air 23 and fluid 25. The second ends of the pressure conduit 22 and the fluid flow conduit 24 reciprocally receive a first end 31 of each connector 29 respectively. A silicon glue 32 is spread over the connection between the conduits 22, 24 and the connectors 29, thereby avoiding leakage. A second end 30 of each connector 29 has a wider diameter than the first end 31. A rubber gasket seal 33 is fixedly attached to the second end 30 of each connector 29.

A container lid 38 threadedly receives a mouth 40 on the top of a fluid container 44. The mouth defines an opening 42 in the top of the fluid container 44. The circumference of the container lid 38 can be of various sizes to conform to the varying circumferences of common container openings. As in FIG. 4 and FIG. 5, alternative embodiments incorporate many of the varying circumferences into one container lid 38. Each lid circumference contains a threaded portion which adapts to respective container mouths 40.

A first 35 and second 36 opening in the side surface of the container lid 38 threadedly receives the connectors 29. By removing the connectors 29, the container lid 38 can be separated from the portable fluid dispenser 1 for easy cleaning. A first opening 35 communicates with a first port 92 which communicates with the fluid container 44 and allows gas 23 to flow into the fluid container 44. A second opening 36 communicates with a second port 94 which is reciprocally received by a third conduit 46. The third conduit 46 extends into the fluid container 44, so that the second end of the third conduit 46 rests on the bottom of the fluid container 44. The second end of the third conduit 46 contains an opening 43 which is angled, prohibiting the opening 43 from resting against the bottom of the fluid container 44, thus allowing the entrance of fluid 45 into the third conduit 46.

The side surface of the container lid 38 contains a pressure relief valve 37 therein. The pressure relief valve 37 is a safety feature and includes a finger-engageable loop 39 which is manually pulled in a horizontal direction to relieve the internal pressure within the container before the gas-tight seal about an access aperture 42 is broken.

A fourth conduit 6 branches off of the first end of the fluid flow conduit 24. The forth conduit 6 terminates in a valve 10. The valve 10 is controlled by a spring-actuated lever 8 which opens and closes the valve 10.

When the plunger 3 is pressed toward the base 5, the pumping action forces air 23 into the pressure conduit 22. The connector 29 receives the air 23 from the pressure conduit 22, allowing the air 23 to be injected into the container. The injection of air 23 into the fluid container 44 forms pressure in the fluid container 44. The pressure forces the fluid 45 out of the fluid container 44 and into the third conduit 46, which is immersed in the fluid 45. The fluid 25 then flows through the fluid flow conduit 24 and into the forth conduit 6. When the spring-actuated lever 8 is pushed down, the valve 10 is opened and the fluid 25 can exit the dispenser.

Preferred embodiments include the pump means 2 and valve 10 connected to a top rim 52 of a golf bag 54 by any suitable means and the fluid container 44 located within the golf bag 54, preferably in an ice-filled, water-resistant, insulated pouch 70 attached to a lower sidewall 80 of the golf bag 54. The pouch contains a drainage plug 71 to allow excess fluid to exit. The pressure and fluid flow conduits 22, 24 are incorporated within the sidewall 80 of the golf bag 54.

An alternative embodiment includes a one-piece housing 60 containing the pump means 2, the pressure conduit 22 and the fluid flow conduit 24. The housing 60 is retrofittable to the golf bag 54. The housing 60 can be reciprocally received through the opening in the top rim 52 of the golf bag 54. The housing 60 has any suitable securing means 62, such as a "J" hook or spring-tensioned clip, for securing the housing 60 onto the top rim 52 of the golf bag 54. The housing 60 can also be placed on the outer side wall 80 of the golf bag 54 while still being secured on the top rim 52 of the golf bag 54 by a "J" hook or spring-tensioned clip 62. The housing 60 placed on the outer side wall 80 of the golf bag 54 can also be secured by a buckle or VELCRO™ strap that wraps around the circumference of the golf bag 54.

The pressure and fluid flow conduits 22, 24 may contain additional branches for connection to two fluid containers 44 simultaneously, increasing the fluid capacity of the device. The pump means 2 may be a manual, gas or electric pump which forces fluid 45 out of a fluid container 44 and into a dispensing means 10. The dispensing means 10 may be spring-actuated or pressure-actuated. The fluid container 44 may be an insulated thermos for hot fluids.

It will be apparent to those skilled in the art, that the foregoing detailed description of the preferred embodiment of the present invention is representative of a type of portable fluid dispenser within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

I claim:

1. A portable fluid dispenser including:

(a) a carrying case adapted to receive said portable fluid dispenser, said carrying case having a top rim defining a main opening, said carrying case having a circumference and an inner and outer side wall defining an inside cavity;

(b) a pump means for providing positive pressure, said pump means fixedly attached to said carrying case;

(c) at least one pressurizing passage means for directing said positive pressure provided by said pump means, said pressurizing passage means having a first end and a second end, said first end of said pressurizing passage means fixedly attached to said pump means;

(d) at least one lid means for sealing pressure inside the container, said lid means having a side surface and a circumference, said side surface reciprocally receiving said second end of said pressurizing passage means;

(e) at least one fluid container having an internal compartment, a lower end and a mouth, said mouth of said fluid container being removably secured within said lid means, thereby sealing said mouth of said fluid container;

(f) at least one discharge passage means for directing fluid, said discharge passage means having a first end, second end and midpoint, said second end of said discharge passage means having an opening, said second end reciprocally received in said lid means; and (g) a valve means for controlling the dispensing of the fluid, said valve means communicating with said first end of said discharge passage means.

2. The portable fluid dispenser of claim 1 wherein said pump means includes a gas accumulating chamber and a hand actuatable plunger therein, said plunger being movable in opposite linear directions for forcing said gas from said accumulating chamber into said pressurizing passage means and then into said internal compartment of said fluid container.

3. The portable fluid dispenser of claim 1 wherein said pump means includes at least one of a hand pump, a $CO_2$ pump and an electric pump.

4. The portable fluid dispenser of claim 1 wherein said carrying case is at least one of any conventional golf bag and a backpack.

5. The portable fluid dispenser of claim 1 further including a pressure relief valve means for preventing excess pressure build-up within said fluid container, said pressure relief valve means communicating with said internal compartment of said fluid container.

6. The pressure relief valve means of claim 5 wherein said pressure relief valve means is a pressure relief valve reciprocally received by said lid means.

7. The portable fluid dispenser of claim 1 wherein said pump means and said first end of said discharge passage means fixedly attaches to said top rim of said carrying case.

8. The portable fluid dispenser of claim 1 wherein said pressurizing passage means comprises a rubberized pressure conduit.

9. The portable fluid dispenser of claim 1 wherein said pressurizing passage means includes a back flow prevention means for restricting the reverse flow of gas and fluid.

10. The portable fluid dispenser of claim 1 wherein said discharge passage means comprises a rubberized fluid flow conduit.

11. The portable fluid dispenser of claim 1 wherein said pressurizing passage means and said discharge passage means within said inside of said side wall of said carrying case.

12. The portable fluid dispenser of claim 1 further including a housing containing said pump means, said pressurizing passage means and said discharge passage means, said housing being retrofittable to said carrying case.

13. The housing of claim 12 wherein said housing being reciprocally received through said opening of the top rim of said carrying case, said housing having a securing means for securing said housing onto said top rim of said carrying case.

14. The housing of claim 12 wherein said housing being secured on said outer side wall of said carrying case, said housing having at least one of a securing means for securing said housing onto said top rim of said carrying case and a strap for securing said housing around said circumference of said carrying case.

15. The portable fluid dispenser of claim 1 wherein said pressurizing passage means and said discharge passage means include additional branches for communicating in series to a plurality of said fluid containers simultaneously.

16. The pressurizing passage means and discharge passage means of claim 15 wherein the simultaneous communication to said plurality of fluid containers includes said discharge passage means of a first fluid container fixedly attached to said lid means of a second fluid container, said discharge passage means of said second fluid container communicating with said valve means.

17. The portable fluid dispenser of claim 1 further including an insulated, water-tight pouch having an inside, sides, bottom and top, said top of said insulated pouch having an open edge for loading and removing at least one said fluid container, said open edge of said insulated pouch having a sealing means for securing said fluid containers and preventing the escape of thermal energy, said insulated pouch fixedly attached to said side wall of said carrying case, said fluid container resting within said inside of said insulated pouch, said sides of said insulated pouch having openings allowing communication with said discharge passage means and said pressurizing passage means, and said bottom of said pouch having a drainage means for allowing the release of excess fluid.

18. The portable fluid dispenser of claim 1 wherein said lid means includes interchangeable fluid container lids, each of said circumferences of said container lids conforming to the varying said circumferences of common container openings.

19. The portable fluid dispenser of claim 1 wherein said lid means includes said container lid having at least one of said side surfaces, said side surfaces having threaded portions of varying said circumferences incorporated within said container lid, said threaded portions of said container lids adapting to respective said mouths of said fluid containers.

20. The portable fluid dispenser of claim 1 wherein said lid means includes a first opening and a second opening within said side surface of said lid means, said first and second openings of said lid means threadedly receive said first and second connectors respectively, said first opening communicates with a first port in said lid means, said first port communicates with said fluid container, thereby allowing gas to flow into the fluid container, said second opening of said lid means communicates with a second port in said lid means.

21. The portable fluid dispenser of claim 1 wherein a third conduit having a first end and a second end, said second end having an opening, said first end reciprocally receives said second port of said lid means, said second end communicates with said internal compartment of said fluid container adjacent said lower end thereof, said opening of the second end of said third conduit being angled to prohibit said opening from resting perpendicular to said lower end of said fluid container, thus allowing the entrance of said fluid into said third conduit.

\* \* \* \* \*